United States Patent
Terada

(10) Patent No.: US 11,039,063 B2
(45) Date of Patent: Jun. 15, 2021

(54) IMAGING SYSTEM, INFORMATION PROCESSING APPARATUS, SERVER APPARATUS, INFORMATION PROCESSING METHOD, AND INFORMATION PROCESSING PROGRAM

(71) Applicant: FUJIFILM Corporation, Tokyo (JP)

(72) Inventor: Masahiro Terada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/840,475

(22) Filed: Apr. 6, 2020

(65) Prior Publication Data

US 2020/0236275 A1      Jul. 23, 2020

Related U.S. Application Data

(63) Continuation of application No. PCT/JP2018/037706, filed on Oct. 10, 2018.

(30) Foreign Application Priority Data

Oct. 25, 2017    (JP) .............................. JP2017-206656

(51) Int. Cl.
    *H04N 5/232* (2006.01)
    *H04N 1/00* (2006.01)
    *H04N 101/00* (2006.01)

(52) U.S. Cl.
    CPC ..... *H04N 5/23222* (2013.01); *H04N 1/00244* (2013.01); *H04N 5/23206* (2013.01);
    (Continued)

(58) Field of Classification Search
    CPC ........... H04N 5/23203; H04N 5/23206; H04N 5/23216; H04N 5/23222; H04N 1/00204; H04N 1/00244
    See application file for complete search history.

(56) References Cited

U.S. PATENT DOCUMENTS 8,432,452 B2    4/2013  Moriyama
9,288,374 B1 *  3/2016  Cooper ................. H04N 5/232
(Continued)

FOREIGN PATENT DOCUMENTS

JP    2003122652    4/2003
JP    2008017224    1/2008
(Continued)

OTHER PUBLICATIONS

Office Action of Japan Counterpart Application, with English translation thereof, dated Feb. 2, 2021, pp. 1-11.
(Continued)

*Primary Examiner* — Paul M Berardesca
(74) *Attorney, Agent, or Firm* — JCIPRNET

(57) ABSTRACT

An imaging system includes an information processing apparatus including a transmission-unit that transmits attribute information related to a user performing imaging using an imaging-apparatus and setting information representing setting related to the imaging performed by the imaging-apparatus at a predetermined timing, a server apparatus including a processing-unit that receives a plurality of combinations of the attribute information and the setting information and performs statistical processing on the combinations of the attribute information and the setting information based on the plurality of combinations of the attribute information and the setting information, a derivation-unit that derives recommended setting information corresponding to the attribute information as a derivation target for the recommended setting information from a result of the statistical processing performed by the processing-unit, and a setting-unit that sets the recommended setting information derived by the derivation-unit in the imaging-apparatus as the setting information related to the imaging performed by the imaging-apparatus.

20 Claims, 9 Drawing Sheets

(52) U.S. Cl.
CPC ..... *H04N 5/23216* (2013.01); *H04N 5/23229* (2013.01); *H04N 5/23245* (2013.01); *H04N 5/232941* (2018.08); *H04N 5/232933* (2018.08); *H04N 2101/00* (2013.01); *H04N 2201/0084* (2013.01)

(56) References Cited

U.S. PATENT DOCUMENTS

| | | | |
|---|---|---|---|
| 2011/0116685 A1 | 5/2011 | Sugita | |
| 2013/0128059 A1* | 5/2013 | Kristensson | H04M 1/72403 348/207.1 |
| 2013/0342713 A1* | 12/2013 | Cui | H04W 4/026 348/207.11 |
| 2015/0036003 A1* | 2/2015 | Sakurai | H04N 5/772 348/207.11 |
| 2016/0142625 A1* | 5/2016 | Weksler | H04N 5/23222 348/222.1 |

FOREIGN PATENT DOCUMENTS

| | | |
|---|---|---|
| JP | 2008079229 | 4/2008 |
| JP | 2009044671 | 2/2009 |
| JP | 2011029924 | 2/2011 |
| JP | 2011107899 | 6/2011 |
| JP | 2013109921 | 6/2013 |
| WO | 2017030777 | 2/2017 |

OTHER PUBLICATIONS

"International Search Report (Form PCT/ISA/210) of PCT/JP2018/037706," dated Dec. 25, 2018, with English translation thereof, pp. 1-4.

"Written Opinion of the International Searching Authority (Form PCT/ISA/237) of PCT/JP2018/037706," dated Dec. 25, 2018, with English translation thereof, pp. 1-17.

* cited by examiner

IMAGING SYSTEM, INFORMATION PROCESSING APPARATUS, SERVER APPARATUS, INFORMATION PROCESSING METHOD, AND INFORMATION PROCESSING PROGRAM

CROSS-REFERENCE TO RELATED APPLICATIONS

This application is a Continuation of PCT International Application No. PCT/JP2018/037706 filed on Oct. 10, 2018, which claims priority under 35 U.S.C § 119(a) to Japanese Patent Application No. 2017-206656 filed on Oct. 25, 2017. Each of the above application(s) is hereby expressly incorporated by reference, in its entirety, into the present application.

BACKGROUND OF THE INVENTION

1. Field of the Invention

The technology of the present disclosure relates to an imaging system, an information processing apparatus, a server apparatus, an information processing method, and a non-transitory computer readable recording medium storing an information processing program.

2. Description of the Related Art

In general, in an imaging apparatus comprising an imaging unit that images a subject, various types of setting related to imaging such as adjustment of a diopter and setting of auto focus are performed. As a technology for facilitating the setting by a user, for example, JP2011-107899A discloses a technology for specifying a plurality of attributes of a person detected from an image captured by an imaging apparatus and setting a user interface of the imaging apparatus in accordance with a combination of the plurality of specified attributes.

JP2011-029924A discloses a technology for setting an imaging mode of an imaging apparatus by presenting recommended imaging modes on a display unit based on an attribute and a set imaging mode of the imaging apparatus and transmitting functional information related to an imaging mode selected by the imaging apparatus among the presented imaging modes to the imaging apparatus from an information processing apparatus. JP2003-122652A discloses a technology in which a server apparatus stores setting data used for setting an imaging apparatus in a searchable manner along with apparatus model data of the imaging apparatus and sets the imaging apparatus based on the setting data that is searched and acquired based on the apparatus model data.

SUMMARY OF THE INVENTION

In the technologies disclosed in JP2011-107899A, JP2011-029924A, and JP2003-122652A, the imaging apparatus is automatically set. However, the setting may not result in appropriate setting suiting the user who performs imaging using the imaging apparatus, and setting that is not easy to use for the user may be made.

The present disclosure is conceived in view of the above matter. An object of the present disclosure is to provide an imaging system, an information processing apparatus, a server apparatus, an information processing method, and a non-transitory computer readable recording medium storing an information processing program capable of automatically performing setting related to imaging performed by an imaging portion based on automatic setting suiting a user.

In order to achieve the object, an imaging system of the present disclosure comprises an information processing apparatus including a transmission unit that transmits attribute information related to a user performing imaging using an imaging portion and setting information representing setting related to the imaging performed by the imaging portion, at a predetermined timing, a server apparatus including a processing unit that receives a plurality of combinations of the attribute information and the setting information and performs statistical processing on the combinations of the attribute information and the setting information based on the plurality of combinations of the attribute information and the setting information, a derivation unit that derives a recommended value of the setting information corresponding to the attribute information as a derivation target for the recommended value from a result of the statistical processing performed by the processing unit of the server apparatus, and a setting unit that sets the recommended value derived by the derivation unit as the setting information related to the imaging performed by the imaging portion.

In the imaging system of the present disclosure, in a case of performing initial setting of the setting information, the transmission unit may transmit the attribute information as the derivation target for the recommended value.

In the imaging system of the present disclosure, the attribute information may include a feature amount obtained from a history of operations performed by the user with respect to the imaging.

The imaging system of the present disclosure may further comprise a display unit that displays information for causing the user to provide an instruction for whether or not to set the recommended value within a predetermined period from when the setting related to the imaging performed by the imaging portion is changed by the user.

In the imaging system of the present disclosure, the setting unit may not set the recommended value within a predetermined period from when the setting related to the imaging performed by the imaging portion is changed by the user.

In the imaging system of the present disclosure, the setting unit may set the recommended value in a case where the recommended value is different from the setting information, and may not set the recommended value in a case where the recommended value is the same as the setting information related to the imaging performed by the imaging portion.

In the imaging system of the present disclosure, the processing unit may perform the statistical processing by setting a weight of the combination of the attribute information and the setting information related to a user of which a frequency of performing the imaging is lower than a predetermined frequency to be lower than the combination of the attribute information and the setting information related to another user.

In the imaging system of the present disclosure, the predetermined timing may be a timing based on a cumulative amount corresponding to the imaging performed by the imaging portion.

In the imaging system of the present disclosure, the derivation unit may be included in the server apparatus.

In the imaging system of the present disclosure, the derivation unit may be included in the information processing apparatus.

In the imaging system of the present disclosure, the attribute information may include at least one of information corresponding to a physical feature of the user, information corresponding to a sex of the user, information corresponding to an age of the user, or information corresponding to a locality related to the user.

In order to achieve the object, an information processing apparatus of the present disclosure comprises a transmission unit that transmits attribute information related to a user performing imaging using an imaging portion and setting information representing setting related to the imaging performed by the imaging portion, at a predetermined timing, a derivation unit that receives a plurality of combinations of the attribute information and the setting information and derives a recommended value of the attribute information as a derivation target for the recommended value from a result of statistical processing of a server apparatus performing the statistical processing on the combinations of the attribute information and the setting information based on the plurality of combinations of the attribute information and the setting information, and a setting unit that sets the recommended value derived by the derivation unit as the setting information related to the imaging performed by the imaging portion.

In order to achieve the object, a server apparatus of the present disclosure comprises a reception unit that receives a combination of attribute information related to a user performing imaging using an imaging portion and setting information representing setting related to the imaging performed by the imaging portion, the attribute information and the setting information being transmitted from each of a plurality of information processing apparatuses at a predetermined timing, a processing unit that performs statistical processing on the combinations of the attribute information and the setting information based on the plurality of combinations of the attribute information and the setting information, and a derivation unit that derives a recommended value of the attribute information as a derivation target for the recommended value from a result of the statistical processing of the processing unit.

In order to achieve the object, an information processing method of the present disclosure comprises transmitting attribute information related to a user performing imaging using an imaging portion and setting information representing setting related to the imaging performed by the imaging portion, at a predetermined timing, receiving a plurality of combinations of the attribute information and the setting information and deriving a recommended value of the attribute information as a derivation target for the recommended value from a result of statistical processing of a server apparatus performing the statistical processing on the combinations of the attribute information and the setting information based on the plurality of combinations of the attribute information and the setting information, and setting the derived recommended value as the setting information related to the imaging performed by the imaging portion.

In order to achieve the object, a non-transitory computer readable recording medium storing an information processing program of the present disclosure causes a computer to execute a process, the process comprising transmitting attribute information related to a user performing imaging using an imaging portion and setting information representing setting related to the imaging performed by the imaging portion, at a predetermined timing, receiving a plurality of combinations of the attribute information and the setting information and deriving a recommended value of the attribute information as a derivation target for the recommended value from a result of statistical processing of a server apparatus performing the statistical processing on the combinations of the attribute information and the setting information based on the plurality of combinations of the attribute information and the setting information, and setting the derived recommended value as the setting information related to the imaging performed by the imaging portion.

An information processing apparatus of the present disclosure comprises a processor configured to transmit attribute information related to a user performing imaging using an imaging portion and setting information representing setting related to the imaging performed by the imaging portion, at a predetermined timing, receive a plurality of combinations of the attribute information and the setting information and derive a recommended value of the attribute information as a derivation target for the recommended value from a result of statistical processing of a server apparatus performing the statistical processing on the combinations of the attribute information and the setting information based on the plurality of combinations of the attribute information and the setting information, and set the derived recommended value as the setting information related to the imaging performed by the imaging portion.

A server apparatus of the present disclosure comprises a processor configured to receive a combination of attribute information related to a user performing imaging using an imaging portion and setting information representing setting related to the imaging performed by the imaging portion, the attribute information and the setting information being transmitted from each of a plurality of information processing apparatuses at a predetermined timing, perform statistical processing on the combinations of the attribute information and the setting information based on the plurality of combinations of the attribute information and the setting information, and derive a recommended value of the attribute information as a derivation target for the recommended value from a result of the statistical processing.

According to the present disclosure, setting related to imaging performed by an imaging portion can be automatically performed based on automatic setting suiting a user.

DESCRIPTION OF THE PREFERRED EMBODIMENTS

Hereinafter, an example of an embodiment of the technology of the present disclosure will be described in detail with reference to the drawings.

Figure 1:
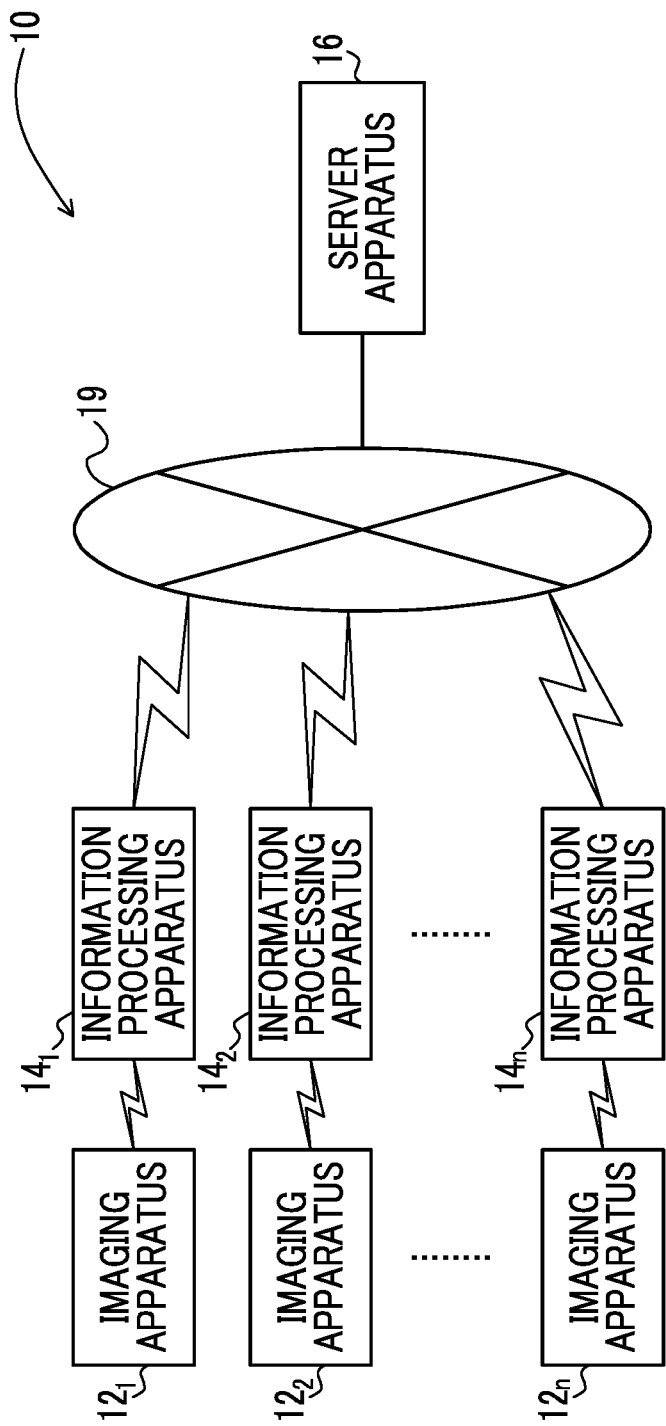
FIG. 1 is a configuration diagram illustrating one example of a configuration of an imaging system of an embodiment.

First, one example of a configuration of an imaging system 10 of the present embodiment will be described with reference to FIG. 1. For example, as illustrated in FIG. 1, the imaging system 10 of the present embodiment comprises imaging apparatuses $12_1$ to $12_n$, information processing apparatuses $14_1$ to $14_n$, and a server apparatus 16. Hereinafter, in a case where the imaging apparatuses $12_1$ to $12_n$ are collectively referred to without distinction therebetween, the imaging apparatuses $12_1$ to $12_n$ will be simply referred to as an "imaging apparatus 12". In a case where the individual imaging apparatuses $12_1$ to $12_n$ are distinguished, the imaging apparatuses $12_1$ to $12_n$ will be referred to with reference signs 1 to n denoting the individual imaging apparatuses $12_1$ to $12_n$. Similarly, in a case where the information processing apparatuses $14_1$ to $14_n$ are collectively referred to without distinction therebetween, the information processing apparatuses $14_1$ to $14_n$ will be simply referred to as an "information processing apparatus 14". In a case where the individual information processing apparatuses $14_1$ to $14_n$ are distinguished, the information processing apparatuses $14_1$ to $14_n$ will be referred to with reference signs 1 to n denoting the individual information processing apparatuses $14_1$ to $14_n$.

The information processing apparatus 14 and the server apparatus 16 are communicably connected through a network 19. In addition, as illustrated in FIG. 1, the information processing apparatus 14 and the imaging apparatus 12 are communicably connected to each other. The information processing apparatus 14 is paired with a single imaging apparatus 12.

Figure 2:
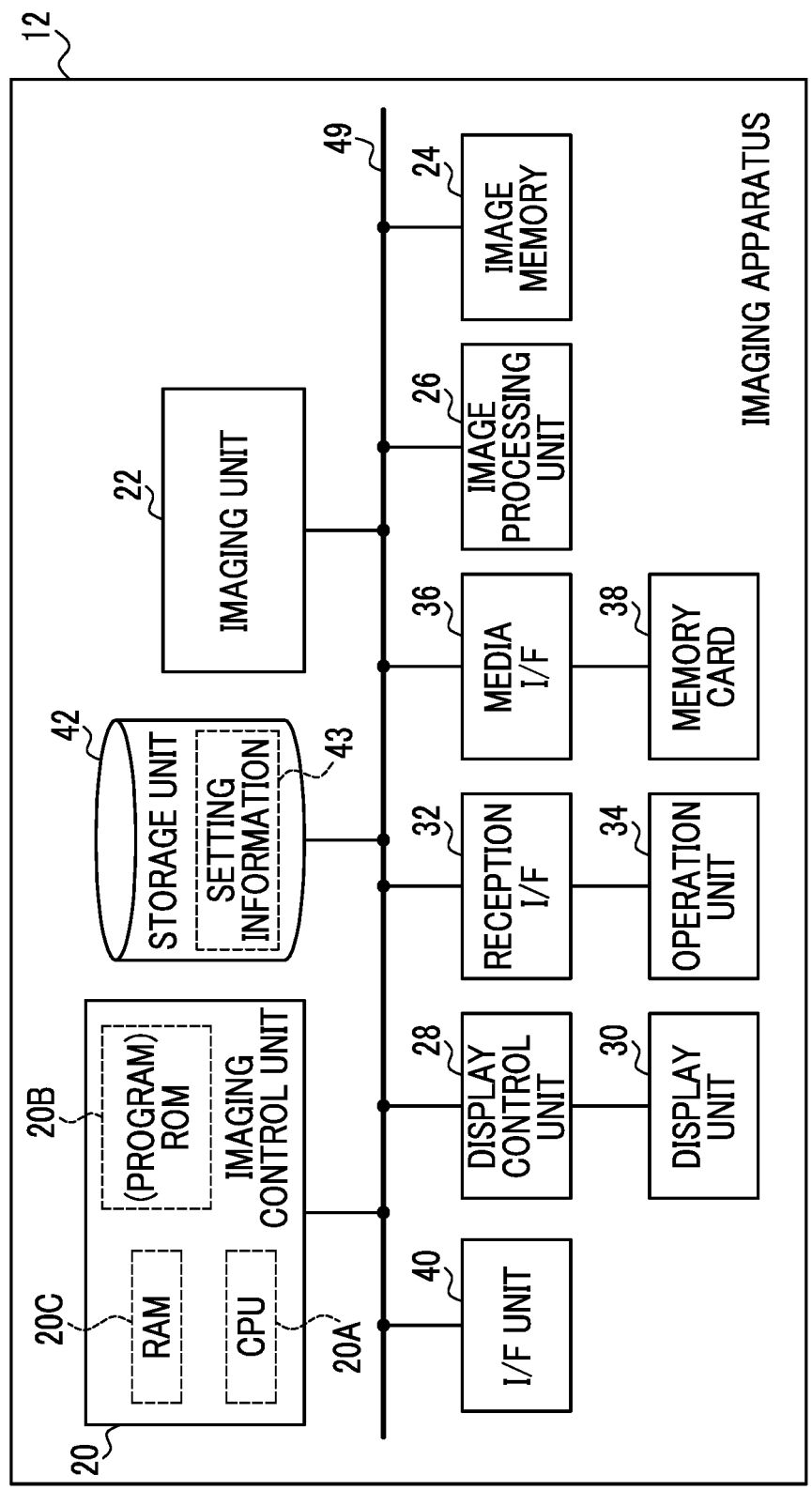
FIG. 2 is a block diagram illustrating one example of a configuration of an imaging apparatus of the embodiment.

The imaging apparatus 12 of the present embodiment is a so-called digital camera. In the present embodiment, for example, the imaging apparatus 12 has a plurality of functions related to imaging such as an auto white balance (AWB) function, an auto exposure (AE) function, and an auto focus (AF) function. FIG. 2 illustrates a block diagram representing one example of a configuration of the imaging apparatus 12 of the present embodiment. As illustrated in FIG. 2, the imaging apparatus 12 of the present embodiment comprises an imaging control unit 20, an imaging portion 22, an image memory 24, an image processing unit 26, a display control unit 28, a display unit 30, a reception interface (I/F) 32, an operation unit 34, a media I/F 36, a memory card 38, an I/F unit 40, and a storage unit 42. The imaging control unit 20, the imaging portion 22, the image memory 24, the image processing unit 26, the display control unit 28, the reception I/F 32, the media I/F 36, the I/F unit 40, and the storage unit 42 are connected through a bus 49.

The imaging control unit 20 comprises a central processing unit (CPU) 20A, a read only memory (ROM) 20B, and a random access memory (RAM) 20C. The CPU 20A controls an overall operation of the imaging apparatus 12. The ROM 20B prestores various programs and the like executed by the CPU 20A. The RAM 20C temporarily stores various data.

The imaging portion 22 includes an imaging optical system, an imaging element, and the like (none of which is illustrated) and has a function of imaging a subject and generating and outputting a captured image. For example, the imaging optical system of the present embodiment includes an incidence lens, a focus lens, a zoom lens, and a stop. In addition, for example, the imaging element of the present embodiment uses a charge coupled device (CCD) image sensor. Alternatively, for example, the imaging element may use another image sensor such as a complementary metal-oxide-semiconductor (CMOS) image sensor.

Subject light that is reflective light representing the subject is transmitted through the incidence lens, the focus lens, and the zoom lens. The quantity of the subject light is adjusted by the stop, and an image of the subject light is formed on a light receiving surface of the imaging element. In the imaging portion 22, various types of processing such as correlative double sampling processing, automatic gain adjustment processing, and analog/digital (A/D) conversion processing on an image signal of one frame imaged by the imaging element.

The imaging portion 22 outputs the digitized image signal to the image memory 24 one frame at a time at a specific frame rate (for example, a few tens of frames/second) that is defined by a clock signal supplied from the CPU 20A of the imaging control unit 20.

The image memory 24 temporarily stores the image signal input from the imaging portion 22.

The image processing unit 26 acquires the image signal from the image memory 24 one frame at a time at the specific frame rate and performs various types of processing such as gamma-correction processing, brightness conversion processing, color difference conversion processing, and compression processing on the acquired image signal. In addition, the image processing unit 26 outputs the image signal obtained by performing various types of processing to the display control unit 28 one frame at a time at the specific frame rate. Furthermore, the image processing unit 26 outputs the image signal obtained by performing various types of processing to the CPU 20A in response to a request from the CPU 20A.

The display control unit 28 is connected to the display unit 30 and controls the display unit 30 under control of the CPU 20A. In addition, the display control unit 28 outputs the image signal input from the image processing unit 26 to the display unit 30 one frame at a time at the specific frame rate.

The display unit 30 displays an image represented by the image signal input from the display control unit 28 at the specific frame rate as a live view image. The live view image is also referred to as a live preview image and is a consecutive frame image obtained by imaging the subject in consecutive frames by the imaging element of the imaging portion 22. The "captured image" also includes the live view image. In addition to the live view image, a playback image, a menu screen, and the like are also displayed on the display unit 30. For example, the display unit 30 is a liquid crystal display (LCD).

The operation unit 34 includes various buttons including a release button disposed in a main body of the imaging apparatus 12 and a dial and the like (none of which is illustrated). In addition, the operation unit 34 of the present embodiment includes a touch panel display (not illustrated)

that is integrated with the display unit 30. The operation unit 34 receives various instructions from a user.

The operation unit 34 is connected to the reception I/F 32 and outputs an instruction content signal indicating a content of a received instruction to the reception I/F 32. The reception I/F 32 outputs the input instruction content signal to the CPU 20A. The CPU 20A executes processing corresponding to the instruction content signal input from the reception I/F 32.

The memory card 38 is attachably and detachably connected to the media I/F 36. The media I/F 36 records and reads out an image file on the memory card 38 under control of the CPU 20A. The image file read out from the memory card 38 by the media I/F 36 is subjected to expansion processing by the image processing unit 26 and is displayed as a playback image on the display unit 30 under control of the CPU 20A.

The I/F unit 40 has a function of communicating with the information processing apparatus 14 by short range wireless communication. In the present embodiment, Bluetooth (registered trademark) is used as one example of the short range wireless communication.

The storage unit 42 is a non-volatile storage unit that stores setting information 43 and the like, described in detail later, representing setting related to imaging. For example, the storage unit 42 is an electrically erasable programmable read-only memory (EEPROM) or a flash memory.

The setting information 43 is not particularly limited as long as the setting information 43 is information that can be newly set and changed. For example, the setting information 43 is exemplified by information related to a mode of the AF, information related to a mode of the AE, information related to a color temperature, information related to a continuous shooting mode, information related to a function (hereinafter, referred to as a "face detection function") of detecting a face image of the subject for focusing, and the like. In addition, for example, the setting information 43 may include information related to an adjustment value of color balance, information related to the number of pixels or image quality of the captured image obtained by the imaging portion 22, and information related to a processing level of a whitening processing filter to be applied to the captured image.

In addition, for example, the setting information 43 may include information related to the amount of time until a power supply is set to an OFF state in a case where a function of automatically setting the power supply to the OFF state is provided, and information related to the amount of timeout in transmission in a case where the captured image is transmitted to the information processing apparatus 14 from the imaging apparatus 12. In addition, for example, the setting information 43 may include information related to the size and color of the font of a text displayed on the display unit 30, information related to an adjustment value of a diopter, and information related to a visual effect in display switching.

In addition, the image processing unit 26 performs so-called RAW development by performing the compression processing on the image signal (RAW data) of the captured image obtained by the imaging portion 22 and generates an image file in a specific format. For example, the specific format may be a Joint Photographic Experts Group (JPEG) format. The generated image file is recorded on the memory card 38 by the image processing unit 26 through the media I/F 36.

The information processing apparatus 14 is a mobile terminal apparatus such as a smartphone and a tablet computer. In the present embodiment, after the information processing apparatus 14 or the imaging apparatus 12 is purchased, the single imaging apparatus 12 is associated with the information processing apparatus 14 by performing pairing (connection setting) after the power supply is switched on. The information processing apparatus 14 of the present embodiment has a function of performing various types of setting related to imaging on the imaging apparatus 12.

Figure 3:
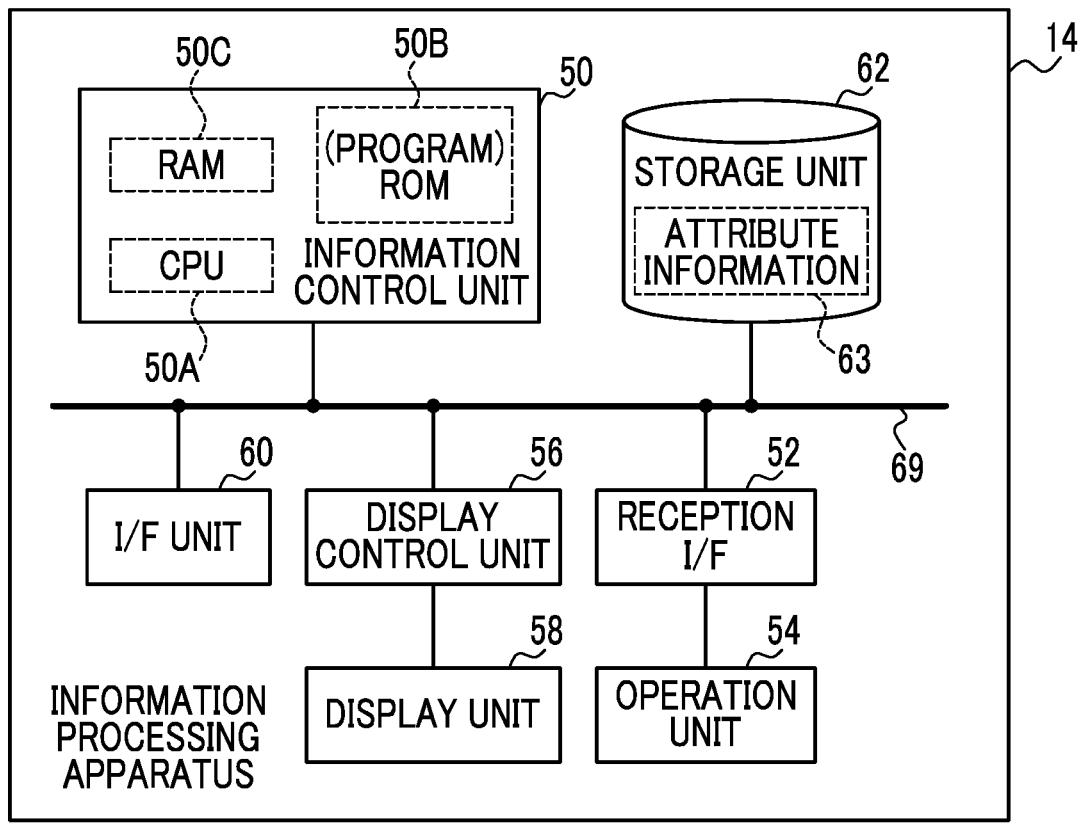
FIG. 3 is a block diagram illustrating one example of a configuration of an information processing apparatus of the embodiment.

FIG. 3 illustrates a block diagram representing one example of a configuration of the information processing apparatus 14 of the present embodiment. As illustrated in FIG. 3, the information processing apparatus 14 of the present embodiment comprises an information control unit 50, a reception I/F 52, an operation unit 54, a display control unit 56, a display unit 58, an I/F unit 60, and a storage unit 62. The information control unit 50, the reception I/F 52, the display control unit 56, the I/F unit 60, and the storage unit 62 are connected to a bus 69.

The information control unit 50 comprises a CPU 50A, a ROM 50B, and a RAM 50C. The CPU 50A controls an overall operation of the information processing apparatus 14. The ROM 50B prestores various programs and the like executed by the CPU 50A including an imaging apparatus setting processing program described later. The RAM 50C temporarily stores various data. The imaging apparatus setting processing program of the present embodiment is one example of an information processing program according to an embodiment of the present disclosure. The information control unit 50 functions as a transmission unit and a setting unit according to the embodiment of the present disclosure by causing the CPU 50A of the present embodiment to execute the imaging apparatus setting processing program.

The operation unit 54 has a function of receiving various instructions from the user and includes various buttons and the like. In addition, the operation unit 54 of the present embodiment includes a touch panel display (not illustrated) that is configured to be integrated with the display unit 58. The operation unit 54 is connected to the reception I/F 52 and outputs an instruction content signal indicating a content of a received instruction to the reception I/F 52. The reception I/F 52 outputs the input instruction content signal to the CPU 50A. The CPU 50A executes processing corresponding to the instruction content signal input from the reception I/F 52.

The display control unit 56 is connected to the display unit 58 and controls the display unit 58 and displays various information on the display unit 58 under control of the CPU 50A. For example, the display unit 58 is a liquid crystal display (LCD) or an electronic view finder (EVF).

The I/F unit 60 has a function of communicating with the imaging apparatus 12 by the short range wireless communication. In addition, the I/F unit 60 has a function of communicating with the server apparatus 16 through the network 19.

The storage unit 62 is a non-volatile storage unit storing attribute information 63 and the like related to the user of the information processing apparatus 14 and is, for example, a hard disk drive (HDD) or a solid state drive (SSD).

The attribute information 63 is attribute information related to the user and is not particularly limited as long as the attribute information 63 is information affecting setting related to imaging of the imaging apparatus 12. In the present embodiment, the attribute information 63 includes a plurality of types of attribute information. For example, the attribute information 63 is exemplified by information corresponding to a physical feature of the user, information corresponding to the sex of the user, information corresponding to the age of the user, and information corresponding to a locality related to the user. The attribute information 63 preferably includes at least one of the information. For example, the information corresponding to the physical feature of the user is exemplified by information representing the height, weight, eye color, skin color, visual acuity, and dynamic visual acuity of the user. In addition, for example, the information corresponding to the locality related to the user is exemplified by a region in which the user resides, and the nationality of the user. In addition, for example, the attribute information 63 may be information representing a language used by the user or information representing a job. Furthermore, for example, the attribute information 63 may include information (hereinafter, referred to as "operation history information of the information processing apparatus 14") representing a feature amount obtained from a history of operations performed on the information processing apparatus 14 by the user. For example, types of feature amounts corresponding to the operation history information of the information processing apparatus 14 are exemplified by the size of the font of a text displayed on the display unit 58, contrast of an image on the display unit 58, the amount of sleep wait time, the amount of long push sensing, and the frequency of posting on a social networking service (SNS). The information control unit 50 derives such information from information set in the information processing apparatus 14 by the user or the history of operations performed on the information processing apparatus 14 by the user and stores the information in the storage unit 62 as the attribute information 63 at a predetermined timing.

In addition, for example, the attribute information 63 may include information (hereinafter, referred to as "operation history information of the imaging apparatus 12") representing a feature amount obtained from a history of operations performed by the user with respect to imaging performed by the imaging apparatus 12. For example, types of feature amounts corresponding to the operation history information of the imaging apparatus 12 are exemplified by the amount of elapsed time from the start of use of the imaging apparatus 12 by the user, the frequency of use of the imaging apparatus 12, the number of times the release button is pushed in one month, a ratio of half push of the release button for focusing on the subject, a time interval between operations performed on a specific key or the like of the operation unit 34 of the imaging apparatus 12, the frequency of use of the EVF, and an imaging ratio of a person. Besides the operation history information of the imaging apparatus 12, information related to the captured image such as the type of captured image and information representing the model of the imaging apparatus 12 may be included in the attribute information 63 with respect to the imaging apparatus 12. The information control unit 50 acquires such information related to the imaging apparatus 12 from the imaging apparatus 12 and stores the information in the storage unit 62 as the attribute information 63 at a predetermined timing.

In the present embodiment, the user of the information processing apparatus 14 is regarded as the same person as the user (hereinafter, simply referred to as the "user of the imaging apparatus 12") who performs imaging using the imaging apparatus 12 paired with the information processing apparatus 14. Thus, the attribute information 63 of the present embodiment is attribute information related to the user of the imaging apparatus 12.

Figure 4:
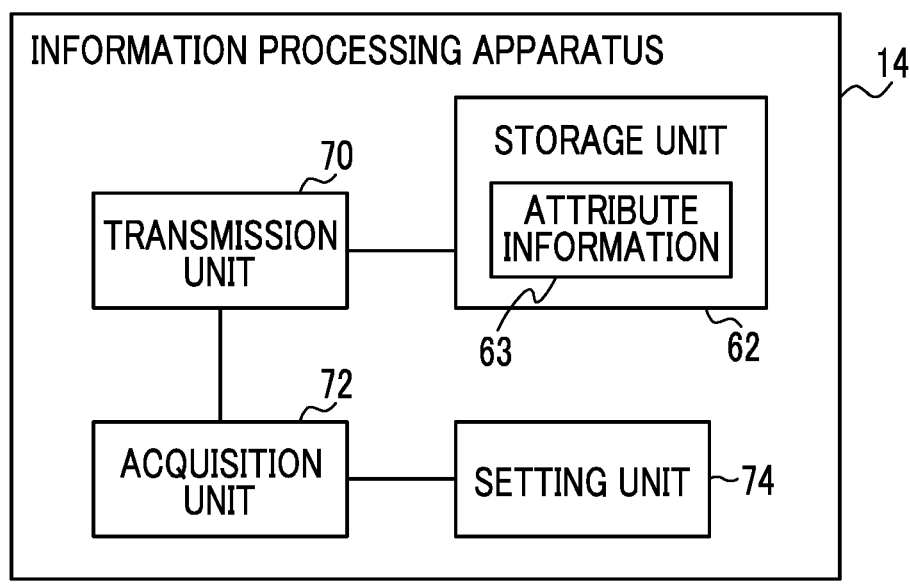
FIG. 4 is a function block diagram illustrating one example of the configuration of the information processing apparatus of the embodiment.

FIG. 4 illustrates a function block diagram representing one example of the configuration of the information processing apparatus 14 of the present embodiment. As illustrated in FIG. 4, the information processing apparatus 14 of the present embodiment comprises a transmission unit 70, an acquisition unit 72, a setting unit 74, and the storage unit 62. The acquisition unit 72 acquires the setting information 43 from the paired imaging apparatus 12 in accordance with a predetermined timing or the like described in detail later. In addition, the acquisition unit 72 acquires recommended setting information, described later, from the server apparatus 16. The transmission unit 70 transmits the attribute information 63 stored in the storage unit 62 and the setting information 43 acquired from the imaging apparatus 12 by the acquisition unit 72 to the server apparatus 16. The setting unit 74 sets the recommended setting information acquired from the server apparatus 16 by the acquisition unit 72 in the imaging apparatus 12.

Figure 5:
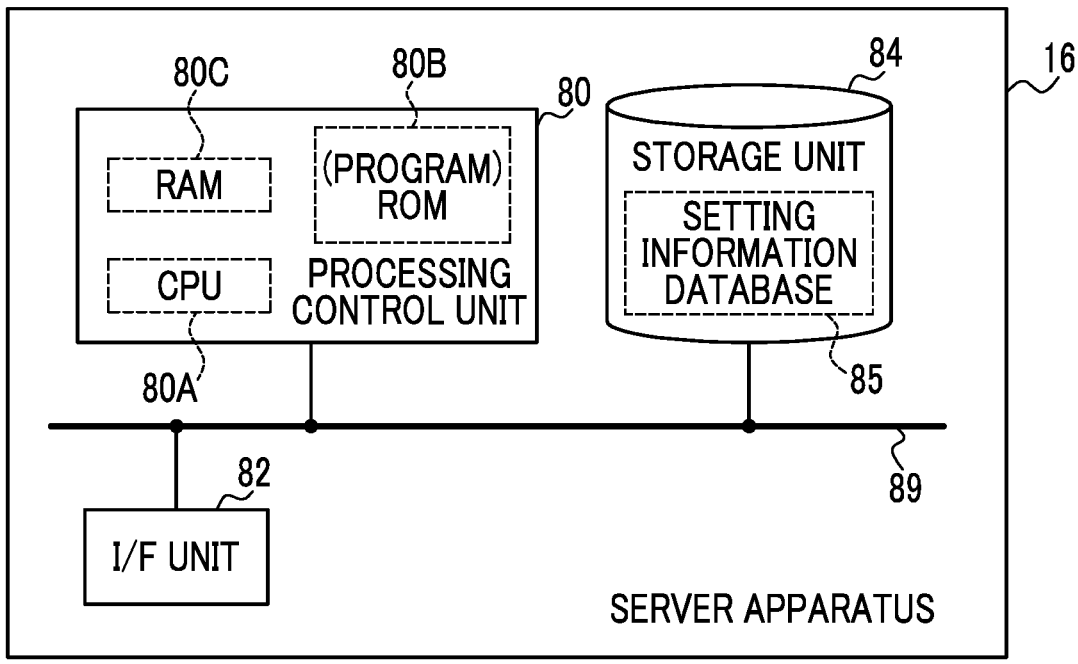
FIG. 5 is a block diagram illustrating one example of a configuration of a server apparatus of the embodiment.

The server apparatus 16 is a so-called server computer or the like. FIG. 5 illustrates a block diagram representing one example of a configuration of the server apparatus 16 of the present embodiment. As illustrated in FIG. 5, the server apparatus 16 of the present embodiment comprises a processing control unit 80, an I/F unit 82, and a storage unit 84. The processing control unit 80, the I/F unit 82, and the storage unit 84 are connected to a bus 89.

The processing control unit 80 comprises a CPU 80A, a ROM 80B, and a RAM 80C. The CPU 80A controls an overall operation of the server apparatus 16. The ROM 80B prestores various programs and the like executed by the CPU 80A including a recommended setting information derivation processing program described later. The RAM 80C temporarily stores various data. The processing control unit 80 functions as a reception unit, a processing unit, and a derivation unit according to the embodiment of the present disclosure by causing the CPU 80A of the present embodiment to execute the recommended setting information derivation processing program.

The I/F unit 82 has a function of communicating with the information processing apparatus 14 through the network 19. The storage unit 84 is a non-volatile storage unit storing a setting information database 85 and the like, described in detail later, and is, for example, an HDD or an SSD.

Figure 6:
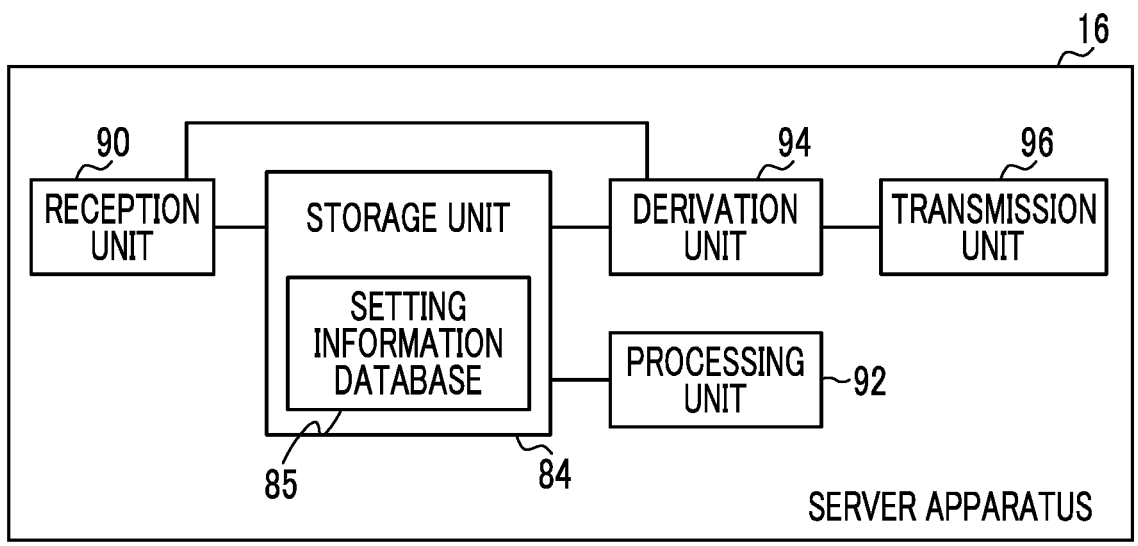
FIG. 6 is a function block diagram illustrating one example of the configuration of the server apparatus of the embodiment.

FIG. 6 illustrates a function block diagram representing one example of the configuration of the server apparatus 16 of the present embodiment. As illustrated in FIG. 6, the server apparatus 16 of the present embodiment comprises a reception unit 90, a processing unit 92, a derivation unit 94, a transmission unit 96, and the storage unit 84. The reception unit 90 receives the setting information 43 and the attribute information 63 transmitted by the information processing apparatus 14 and stores the setting information 43 and the attribute information 63 in the storage unit 84. The processing unit 92 generates the setting information database 85 by performing statistical processing on the setting information 43 and the attribute information 63 stored in the storage unit 84 and stores the setting information database 85 in the storage unit 84. The derivation unit 94 derives the recommended setting information corresponding to the attribute information 63 received by the reception unit 90 from the setting information database 85 stored in the storage unit 84. The transmission unit 96 transmits the recommended setting information derived by the derivation unit 94 to the information processing apparatus 14.

Next, an effect of the imaging system 10 of the present embodiment will be described.

In the imaging system 10 of the present embodiment, as described above, the information processing apparatus 14 performs setting (hereinafter, simply referred to as "setting of the imaging apparatus 12") related to imaging performed by the imaging portion 22 of the associated imaging apparatus 12. Hereinafter, setting related to imaging of the imaging apparatus 12 performed by the information processing apparatus 14 in the imaging system 10 of the present embodiment will be described in detail.

Figure 7:
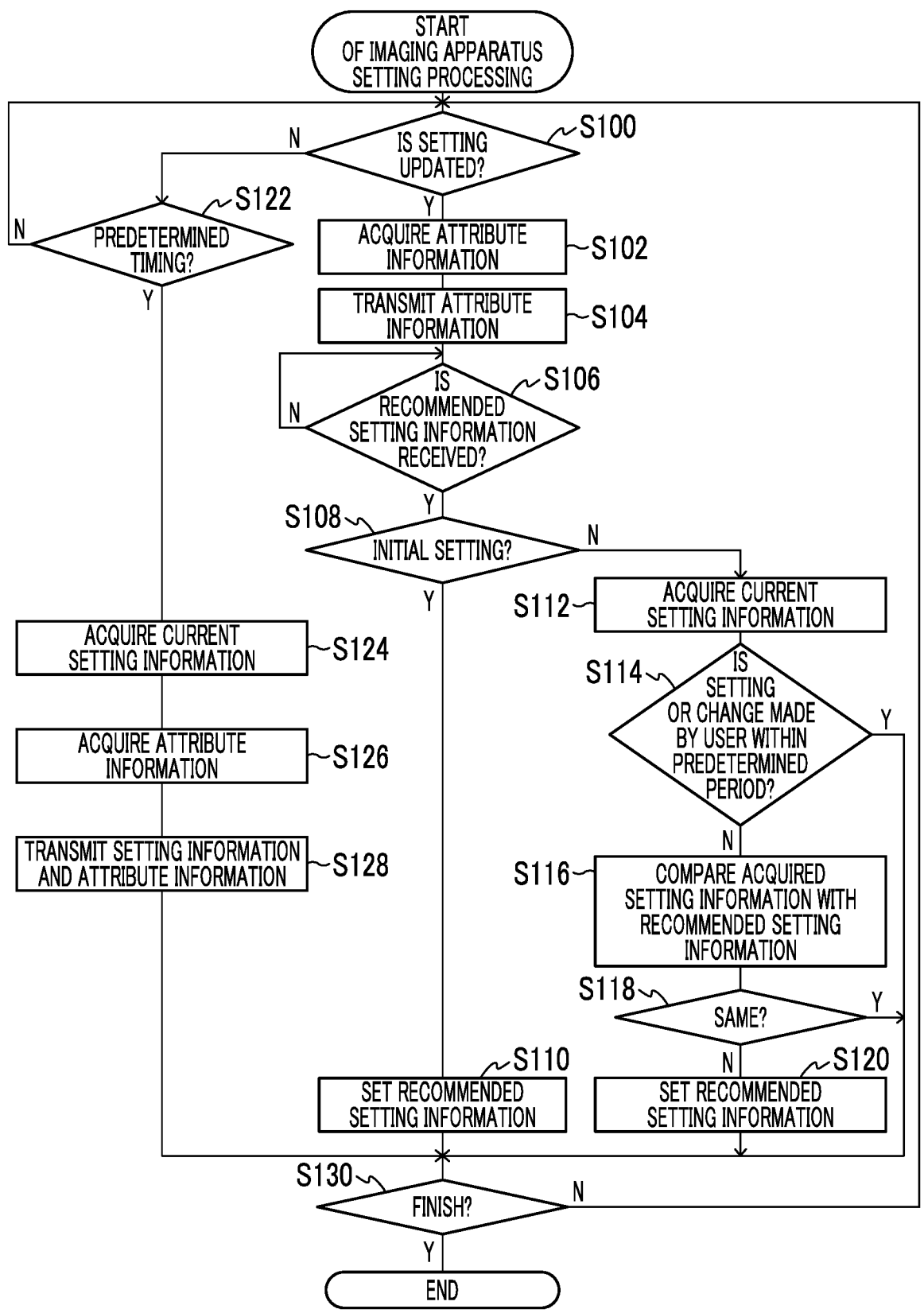
FIG. 7 is a flowchart illustrating one example of a flow of imaging apparatus setting processing in the information processing apparatus of the embodiment.

First, an operation of the information processing apparatus 14 of the present embodiment will be described. FIG. 7 illustrates a flowchart representing one example of a flow of imaging apparatus setting processing executed in the information processing apparatus 14 of the present embodiment.

In the information processing apparatus 14 of the present embodiment, for example, in a case where the power supply of the information processing apparatus 14 is switched on, or in a case where a driving state of the imaging apparatus 12 is monitored and the power supply of the imaging apparatus 12 is set to the ON state, the CPU 50A of the information control unit 50 functions as the transmission unit 70, the acquisition unit 72, and the setting unit 74 and executes the imaging apparatus setting processing illustrated in FIG. 7 by executing the imaging apparatus setting processing program stored in the ROM 50B.

As illustrated in FIG. 7, in step S100, the acquisition unit 72 determines whether or not to update the setting of the imaging apparatus 12, specifically, the setting information 43 stored in the storage unit 42 of the imaging apparatus 12. A timing at which the setting information 43 is updated is not particularly limited and includes at least a timing at which initial setting is performed. The initial setting is not limited to setting initially performed on the imaging apparatus 12 after the purchase of the imaging apparatus 12 and, for example, includes setting performed by updating firmware.

In a case where the timing at which the setting of the imaging apparatus 12 is updated is reached, the determination of step S100 results in a positive determination, and a transition is made to step S102. In step S102, the acquisition unit 72 acquires the attribute information 63 from the storage unit 62.

In subsequent step S104, the transmission unit 70 transmits the attribute information 63 acquired by the acquisition unit 72 to the server apparatus 16. While details will be described later, the server apparatus 16 receiving the attribute information 63 derives a recommended value (hereinafter, referred to as the "recommended setting information") of the setting information corresponding to the attribute information 63 and transmits the recommendation value to the information processing apparatus 14.

Thus, in subsequent step S106, the acquisition unit 72 determines whether or not the recommended setting information is received from the information processing apparatus 14. The determination of step S106 results in a negative determination until the recommended setting information is received. In a case where the recommended setting information is received, the determination of step S106 results in a positive determination, and a transition is made to step S108.

In step S108, the setting unit 74 determines whether or not the update of the setting information 43 corresponds to a case of performing the initial setting is performed. In the case of performing the initial setting, the determination of step S108 results in a positive determination, and a transition is made to step S110. In step S110, the setting unit 74 sets the recommended setting information received from the server apparatus 16 by the acquisition unit 72 in the imaging apparatus 12 and then, transitions to step S130. Specifically, the setting unit 74 stores the recommended setting information in the storage unit 42 of the imaging apparatus 12 as the setting information 43. In the case of performing the initial setting, it is preferable that the setting unit 74 performs date and time setting of the imaging apparatus 12 by referring to date and time setting of the host apparatus.

In a case where the update does not correspond to the case of performing the initial setting, the determination of step S108 results in a negative determination, and a transition is made to step S112. In step S112, the acquisition unit 72 acquires the setting information currently set in the imaging apparatus 12, that is, the setting information 43, from the imaging apparatus 12.

In subsequent step S114, the setting unit 74 determines whether or not at least one of setting or a change in setting of the setting information 43 is made by the user within a predetermined period. In a case where the setting information 43 is information representing setting performed by the user with respect to imaging, the setting corresponding to the recommended setting information may be different from the setting information 43. For example, in setting of the color temperature used for adjusting a white balance, the setting information 43 may be information representing 3000K in accordance with the preference of the user, and the recommended setting information may be information representing 4000K. In such a case, in a case where the setting information 43 suiting the preference of the user is updated using the recommended setting information, setting different from the preference of the user is made. Therefore, in the imaging apparatus 12 of the present embodiment, the update of the setting information 43 based on the recommended setting information is not performed in at least one of a case where the setting information 43 is set by the user within the predetermined period, or a case where the setting of the setting information 43 is changed.

Thus, in a case where at least one of setting or a change in setting of the setting information 43 is made by the user within the predetermined period, the determination of step S114 results in a positive determination, and a transition is made to step S130. Accordingly, in this case, the setting information 43 is not updated based on the recommended setting information.

In a case where any of setting and a change in setting of the setting information 43 is not made by the user within the predetermined period, the determination of step S114 results in a negative determination, and a transition is made to step S116. In step S116, the setting unit 74 compares the setting represented by the recommended setting information with the setting represented by the setting information 43 acquired in step S112. In subsequent step S118, the setting unit 74 determines whether or not the setting represented by the recommended setting information is the same as the setting represented by the setting information 43. The term "same" includes not only a case of being completely the same but also includes a case of being the same within a predetermined range such that in the case of the color temperature, in a case where the color temperature represented by the setting information 43 falls within ±100K of the color temperature represented by the recommended setting information, the color temperatures are regarded as being the same.

The recommended setting information changes in a case where the setting information database 85 is optimized, or in accordance with a change in trend related to imaging such as a usage situation of the user. Thus, the setting represented by the recommended setting information may not be regarded as being the same as the setting represented by the setting information 43. In a case where the setting represented by the recommended setting information is not regarded as being the same as the setting represented by the setting information 43, in other words, in a case where the setting represented by the recommended setting information is different from the setting represented by the setting information 43, the determination of step S118 results in a negative determination, and a transition is made to step S120.

In step S120, the setting unit 74 sets the recommended setting information in the imaging apparatus 12 and then, transitions to step S130 in the same manner as step S110.

In a case where the setting represented by the recommended setting information is regarded as being the same as the setting represented by the setting information 43, the determination of step S118 results in a positive determination, and a transition is made to step S130. Accordingly, in this case, the setting information 43 is not updated based on the recommended setting information. In the present embodiment, by not updating the setting information 43 in a case where the setting represented by the recommended setting information is regarded as being the same as the setting represented by the setting information 43, the frequency of updating the setting information 43 can be reduced, and power consumption can be reduced.

In step S100, in a case where the timing at which the setting of the imaging apparatus 12 is updated is not reached, the determination of step S100 results in a negative determination, and a transition is made to step S122. In step S122, the acquisition unit 72 determines whether or not a predetermined timing at which the setting information 43 and the attribute information 63 are transmitted to the server apparatus 16 is reached. In this case, the predetermined timing is not particularly limited and is preferably a timing based on a cumulative value corresponding to imaging performed by the imaging apparatus 12. For example, such a timing is exemplified by a timing at which the number of times of imaging reaches a predetermined number of times, a timing at which the cumulative amount of time required for imaging reaches a predetermined amount of time, and a timing at which a predetermined amount of elapsed time elapses.

In a case where the predetermined timing is not reached, the determination of step S122 results in a negative determination, and a return is made to step S100. In a case where the predetermined timing is reached, the determination of step S122 results in a positive determination, and a transition is made to step S124.

In step S124, the acquisition unit 72 acquires the setting information currently set in the imaging apparatus 12, that is, the setting information 43, from the imaging apparatus 12. In subsequent step S126, the acquisition unit 72 acquires the attribute information 63 from the storage unit 62. In subsequent step S128, the transmission unit 70 transmits the setting information 43 and the attribute information 63 acquired by the acquisition unit 72 to the server apparatus 16.

In subsequent step S130, the acquisition unit 72 determines whether or not to finish the imaging apparatus setting processing. In the present embodiment, in a case where the power supply of the information processing apparatus 14 is set to the OFF state, and in a case where the driving state of the imaging apparatus 12 is monitored and the power supply of the imaging apparatus 12 is set to the OFF state, the determination of step S130 results in a positive determination, and the imaging apparatus setting processing is finished. In a case that does not correspond to any of the case where the power supply of the information processing apparatus 14 is set to the OFF state and the case where the power supply of the imaging apparatus 12 is set to the OFF state, the determination of step S130 results in a negative determination. A return is made to step S100, and the processing of steps S102 to S128 is repeated.

Figure 8:
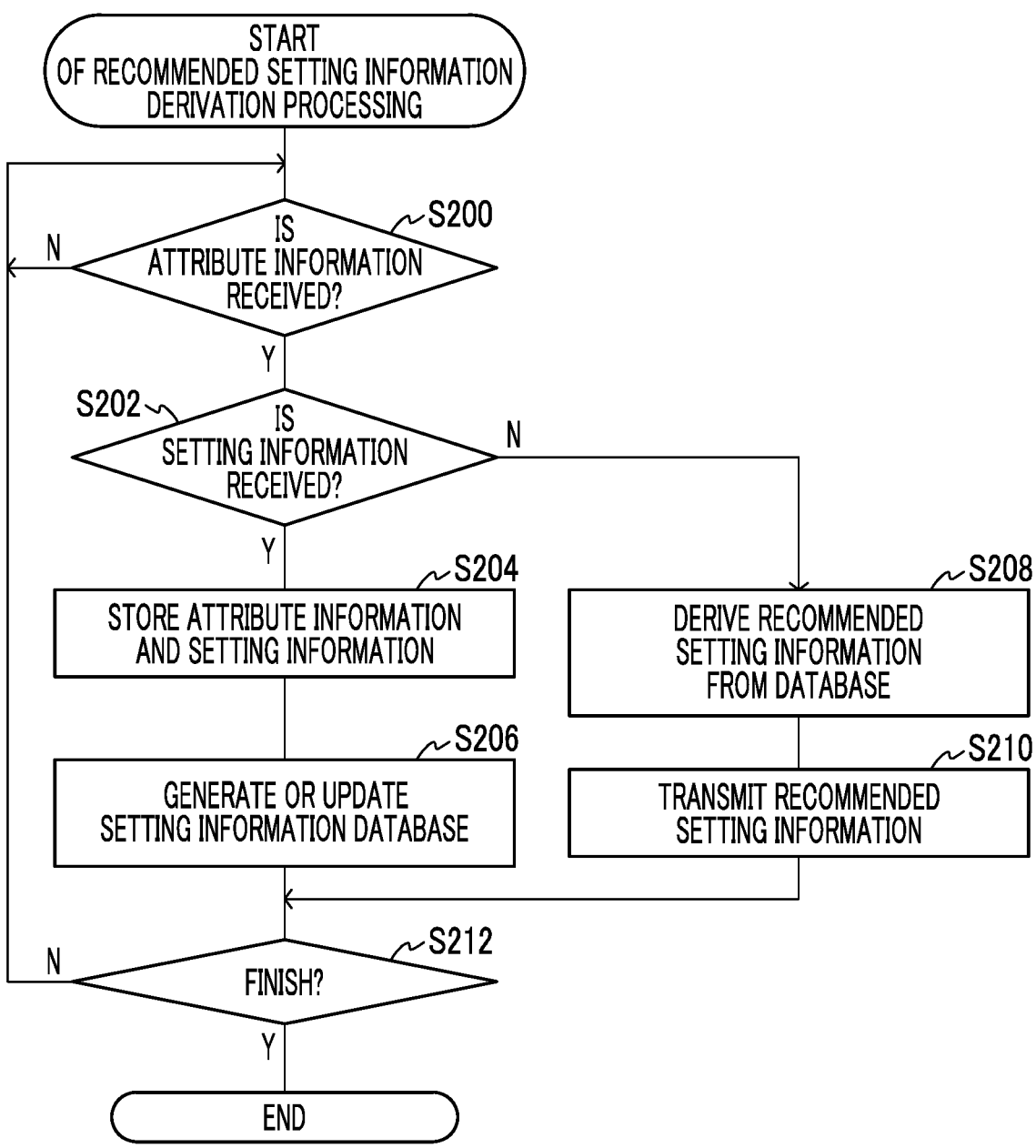
FIG. 8 is a flowchart illustrating one example of a flow of recommended setting information derivation processing in the server apparatus of the embodiment.

Next, an operation for deriving the recommended setting information in the server apparatus 16 of the present embodiment will be described. FIG. 8 illustrates a flowchart representing one example of a flow of recommended setting information derivation processing executed in the server apparatus 16 of the present embodiment.

In the server apparatus 16 of the present embodiment, for example, in a case where the server apparatus 16 is powered up, the CPU 80A of the processing control unit 80 functions as the reception unit 90, the processing unit 92, the derivation unit 94, and the transmission unit 96 and executes the recommended setting information derivation processing illustrated in FIG. 8 by executing the recommended setting information derivation processing program stored in the ROM 80B.

As illustrated in FIG. 8, in step S200, the reception unit 90 determines whether or not the attribute information 63 is received from the information processing apparatus 14. The determination of step S200 results in a negative determination until the attribute information 63 is received. In a case where the attribute information 63 is received, the determination of step S200 results in a positive determination, and a transition is made to step S202.

In step S202, the reception unit 90 determines whether or not the setting information 43 is received. In a case where the setting information 43 is received, that is, in a case where the setting information 43 and the attribute information 63 are transmitted from the imaging apparatus 12 in step S128 of the imaging apparatus setting processing (refer to FIG. 7) in the imaging apparatus 12, the determination of step S202 results in a positive determination, and a transition is made to step S204.

In step S204, the reception unit 90 stores a combination of the received setting information 43 and attribute information 63 in the storage unit 84.

In subsequent step S206, the processing unit 92 generates or updates the setting information database 85 stored in the storage unit 84 and then, transitions to step S212. The processing unit 92 of the present embodiment generates the setting information database 85 by performing the statistical processing on a combination of a plurality of pieces of setting information 43 and attribute information 63 stored in the storage unit 84 and updates the generated setting information database 85.

The setting information database 85 includes a plurality of databases that are provided using specific attribute information as a parameter for types of setting information.

Figure 9A:
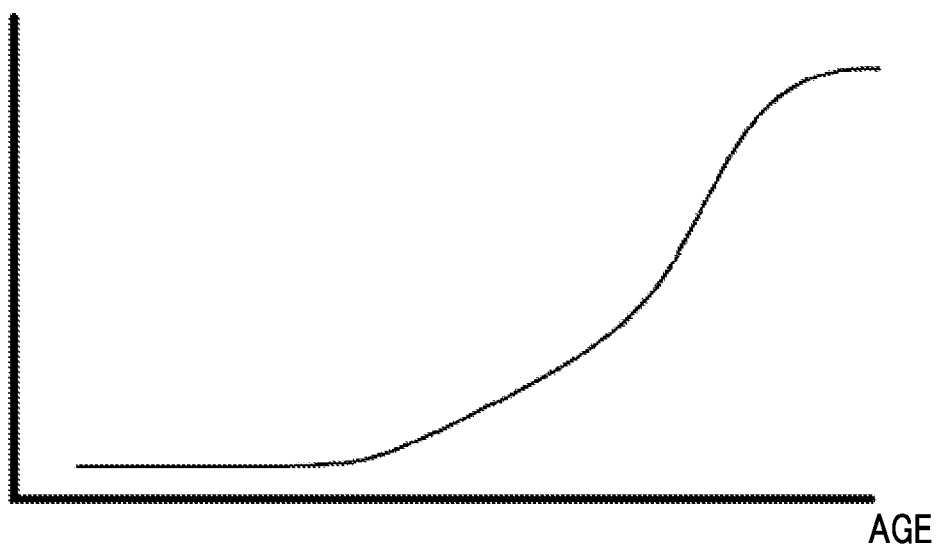
FIG. 9A is a graph illustrating one example of a setting information database.

For example, in general, the age and the adjustment value of the diopter are correlated. As the age is increased, the probability of presbyopia is increased, and the number of users adjusting the diopter is increased. The adjustment value is also increased. Thus, in a case where the type of setting information is the adjustment value of the diopter, the setting information database 85 of the present embodiment includes a setting information database in which the attribute information as the parameter is the age. FIG. 9A illustrates one example of the setting information database in a case where the type of setting information is the adjustment value of the diopter and the attribute information as the parameter is the age.

Figure 9B:
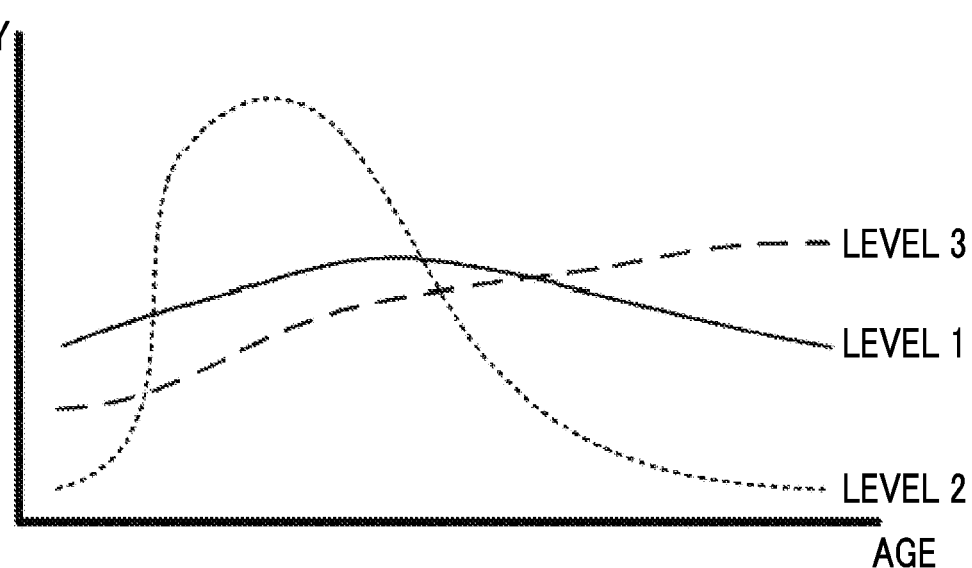
FIG. 9B is a graph illustrating another example of the setting information database.

In addition, for example, the whitening processing filter is more frequently used in the case of a female user or a female subject than in the case of a male user or a male subject. In addition, the level (the extent of whitening) of the whitening processing tends to vary depending on the age or the locality related to the user. Thus, in a case where the type of setting information is the processing level of the whitening processing filter, the setting information database 85 of the present embodiment includes a setting information database in which the attribute information as the parameter is the age, the sex, and the locality related to the user. FIG. 9B illustrates one example of the setting information database in a case where the type of setting information is the processing level of the whitening processing filter and the attribute information as the parameter is the age, the sex, and the locality related to the user. A graph representing the setting information database illustrated in FIG. 9B is obtained for each sex and each locality related to the user.

Besides, for example, a user who uses a model used by a user experienced in imaging or a user who is relatively aged uses a mode in which the stop is prioritized more frequently than a mode in which so-called full auto focus is used. Thus, in a case where the type of setting information is the mode of the AF, a setting information database in which the attribute information as the parameter is the age and the model of the imaging apparatus 12 may be used.

In addition, for example, a user for which it is difficult to half push the release button tends to be able to reduce blurriness of the captured image by using the face detection function. Thus, in a case where the type of setting information is the face detection function, a setting information database in which the attribute information as the parameter is the ratio of the half push of the release button may be used.

In addition, for example, for the same reason as the adjustment value of the diopter, as the age is increased, the size of the font of the text displayed on the display unit 30 of the imaging apparatus 12 tends to be increased. Thus, in a case where the type of setting information is the size of the font of the text displayed on the display unit 30, a setting information database in which the attribute information as the parameter is the age may be used.

In a case where the processing unit 92 generates or updates the setting information database, it is preferable to perform the statistical processing by setting a weight of the combination of the attribute information 63 and the setting information 43 received from the information processing apparatus 14 associated with the imaging apparatus 12 of the user of which the frequency of performing imaging is lower than a predetermined frequency to be lower than the combination of the attribute information 63 and the setting information 43 received from the information processing apparatus 14 associated with the imaging apparatus 12 of another user (a user of which the frequency of performing imaging is higher than or equal to the predetermined frequency). In a case where the frequency of performing imaging is lower than the predetermined frequency, appropriate setting may not be made in the imaging apparatus 12. That is, the setting information 43 may not be appropriate. Thus, the processing unit 92 can further increase the accuracy of the setting information database by performing the statistical processing by setting different weights as described above.

In a case where the setting information 43 is not received, that is, in a case where only the attribute information 63 is transmitted from the imaging apparatus 12 in step S104 of the imaging apparatus setting processing (refer to FIG. 7) in the imaging apparatus 12, the determination of step S202 results in a negative determination, and a transition is made to step S208. In step S208, the derivation unit 94 derives the recommended setting information corresponding to the received attribute information 63 from the setting information database 85.

In subsequent step S210, the transmission unit 96 transmits the recommended setting information derived by the derivation unit 94 to the information processing apparatus 14 which is a transmission source transmitting the attribute information 63 to the server apparatus 16 and then, transitions to step S212.

In subsequent step S212, the reception unit 90 determines whether or not to finish the recommended setting information derivation processing. In a case where a power supply of the server apparatus 16 is set to the OFF state, the determination of step S212 results in a positive determination, and the recommended setting information derivation processing is finished. In a case where the power supply of the server apparatus 16 remains in the ON state, the determination of step S212 results in a negative determination. A return is made to step S200, and the processing of steps S202 to S210 is repeated.

As described above, the imaging system 10 of the present embodiment comprises the information processing apparatus 14 comprising the transmission unit 70 that transmits the attribute information related to the user performing imaging using the imaging portion 22 of the imaging apparatus 12 and the setting information representing the setting related to imaging performed by the imaging apparatus 12 at the predetermined timing, and the server apparatus 16 comprising the processing unit 92 that receives a plurality of combinations of the attribute information and the setting information and performs the statistical processing on the combinations of the attribute information and the setting information based on the plurality of combinations of the attribute information and the setting information. In addition, the imaging system 10 comprises the derivation unit 94 that derives the recommended setting information corresponding to the attribute information as a derivation target for the recommended setting information from the result of the statistical processing performed by the processing unit 92 of the server apparatus 16, and the setting unit 74 that sets the recommended setting information derived by the derivation unit 94 in the imaging apparatus 12 as setting information related to imaging performed by the imaging apparatus 12.

In the server apparatus 16 of the imaging system 10 of the present embodiment, as the number of imaging apparatuses 12 connected to the server apparatus 16 through the network 19 via the information processing apparatus 14 is increased, and as the amount of time of use of the imaging apparatus 12 is increased, more combinations of the setting information 43 and the attribute information 63 are obtained. By obtaining more combinations of the setting information 43 and the attribute information 63, the accuracy of the setting information database 85 is increased, and the setting information database 85 is automatically optimized in the imaging system 10 of the present embodiment. Thus, according to the imaging system 10 of the present embodiment, more optimal recommended setting information can be set in the imaging apparatus 12.

According to the imaging system 10 of the present embodiment, the setting related to imaging performed by the imaging apparatus 12 can be automatically performed based on automatic setting suiting the user.

In the case of a general imaging apparatus, in a state where the imaging apparatus is shipped from a maker (factory), general, so-called acceptable setting is made as the initial setting by the maker, and setting suiting each of various users is not individually made. Thus, for many users, so-called setting that does not suit the user and is not easy to use is made. Setting a state suiting the preference of the user from such a state is mostly complicated and requires effort, and the user may continue using the imaging apparatus in the initial setting, that is, in setting that is difficult to use.

Meanwhile, in the imaging system 10 of the present embodiment, setting can be performed from the stage of the initial setting based on the recommended setting information suiting the user of the imaging apparatus 12. Thus, the effort of performing setting by the user can be reduced. Furthermore, the captured image suiting the preference of the user is obtained. In addition, in the imaging system 10 of the present embodiment, setting is automatically performed for a convenient function that the user does not perceive without referring to a manual or convenient setting while using the imaging apparatus 12. Thus, the convenience of the user can be further increased.

Figure 10:
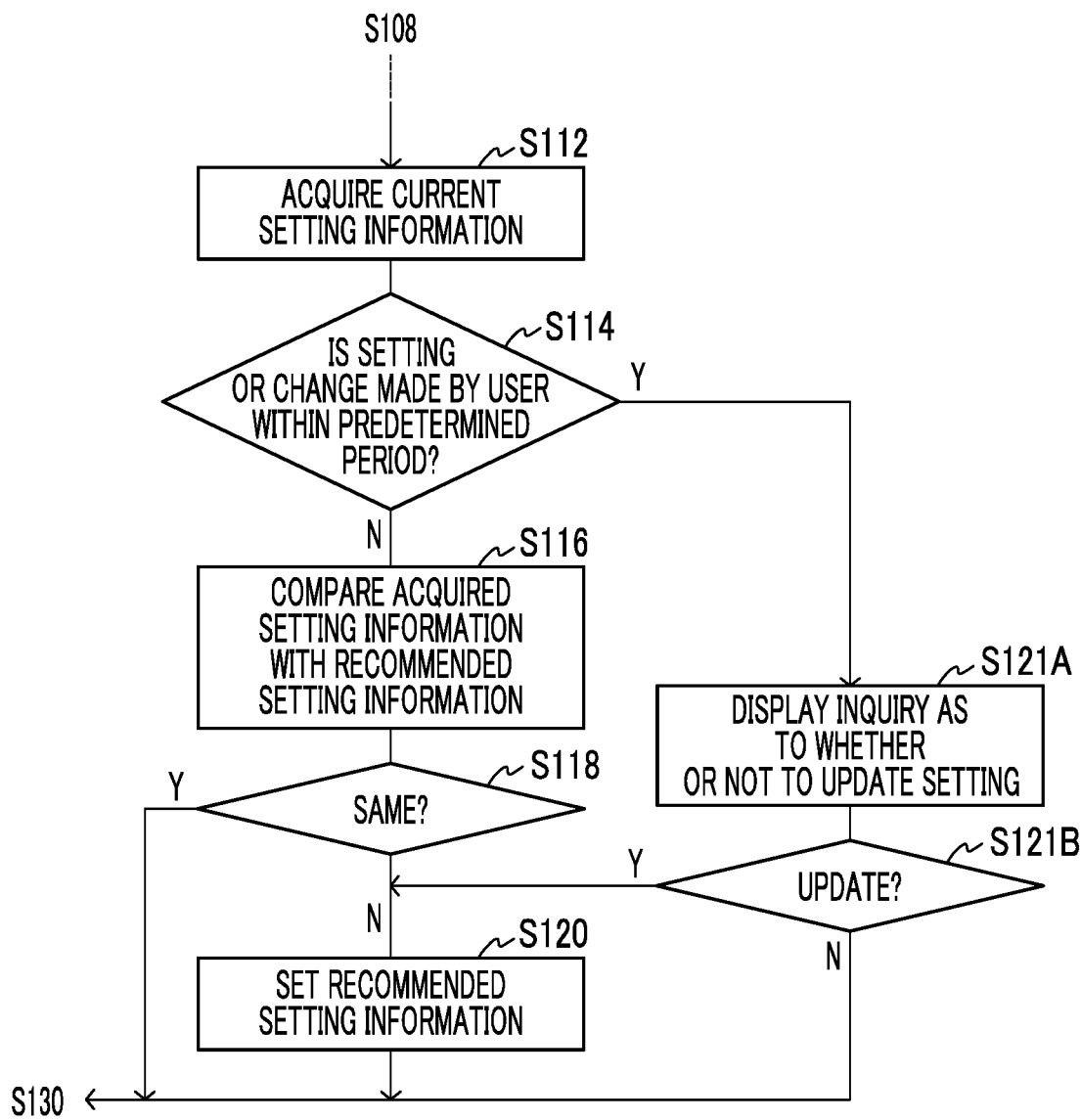
FIG. 10 is a flowchart illustrating another example of the flow of imaging apparatus setting processing in the information processing apparatus of the embodiment.

In the imaging apparatus setting processing (refer to FIG. 7) executed by the information processing apparatus 14 of the embodiment, an aspect in which in a case where step S114 results in a positive determination, a transition is made to step S130, and the setting information 43 is not updated based on the recommended setting information has been described. Alternatively, in this case, an aspect in which the update is performed in accordance with a designation of the user may be available. For example, as in the imaging apparatus setting processing illustrated in FIG. 10, in a case where step S114 results in a positive determination, a transition is made to step S121A. In step S121A, the setting unit 74 displays information for inquiring whether or not to update setting on the display unit 30 of the imaging apparatus 12 or the display unit 58 of the information processing apparatus 14 for the user. In response to the inquiry, the user designates whether or not to perform the update through the operation unit 34 of the imaging apparatus 12 or the operation unit 54 of the information processing apparatus 14. Thus, in subsequent step S121B, a determination as to whether or not performing the update is designated from the user is performed. In a case where performing the update is designated, the determination of step S121B results in a positive determination, and a transition is made to step S120. In a case where it is determined that the update is not performed, the determination of step S121B results in a negative determination, and a transition is made to step S130. By such an embodiment, the update of the setting information 43 suiting the preference of the user to setting different from the preference of the user based on the recommended setting information can be reduced in the same manner as the above embodiment.

In addition, the present disclosure is not limited to the embodiment. Setting of whether or not to use the recommended setting information as the setting information 43 by the user may be enabled. For example, considering a user or the like who desires to automatically update (set) the adjustment value of the color balance and maintain the state of the mode of the AF set by the user, setting of whether or not to use the recommended setting information as the setting information 43 by the user may be enabled for each type of recommended setting information.

In addition, for example, as in a case where the imaging apparatus 12 is a new product, there is concern that the number of combinations of the setting information 43 and the attribute information 63 constituting the setting information database 85 is relatively small and appropriate recommended setting information cannot be derived. In such a case, the server apparatus 16 may use an initial value set by the maker or the like of the imaging apparatus 12 as the recommended setting information until the number of combinations of the setting information 43 and the attribute information 63 becomes a number sufficient for obtaining the setting information database 85.

The setting information that can be generally set by the user is illustrated as the setting information 43 in the embodiment. Alternatively, the setting information 43 may include setting information (internal parameter) of setting that cannot be generally set by the user or is prohibited from being set by the user. For example, such an internal parameter is exemplified by the amount of timeout after which connection between the information processing apparatus 14 and the imaging apparatus 12 is disconnected. For example, in a case where the frequency of causing timeout in the connection between the information processing apparatus 14 and the imaging apparatus 12 is high, it is preferable to set a larger amount of time than usual as the amount of timeout.

The embodiment has been described such that the attribute information 63 is stored in the storage unit 62 of the information processing apparatus 14 and the information processing apparatus 14 acquires the attribute information 63 from the storage unit 62. However, an apparatus in which the attribute information 63 is stored is not particularly limited. For example, the attribute information 63 may be stored in the storage unit 42 of the imaging apparatus 12 along with the setting information 43.

Figure 11:
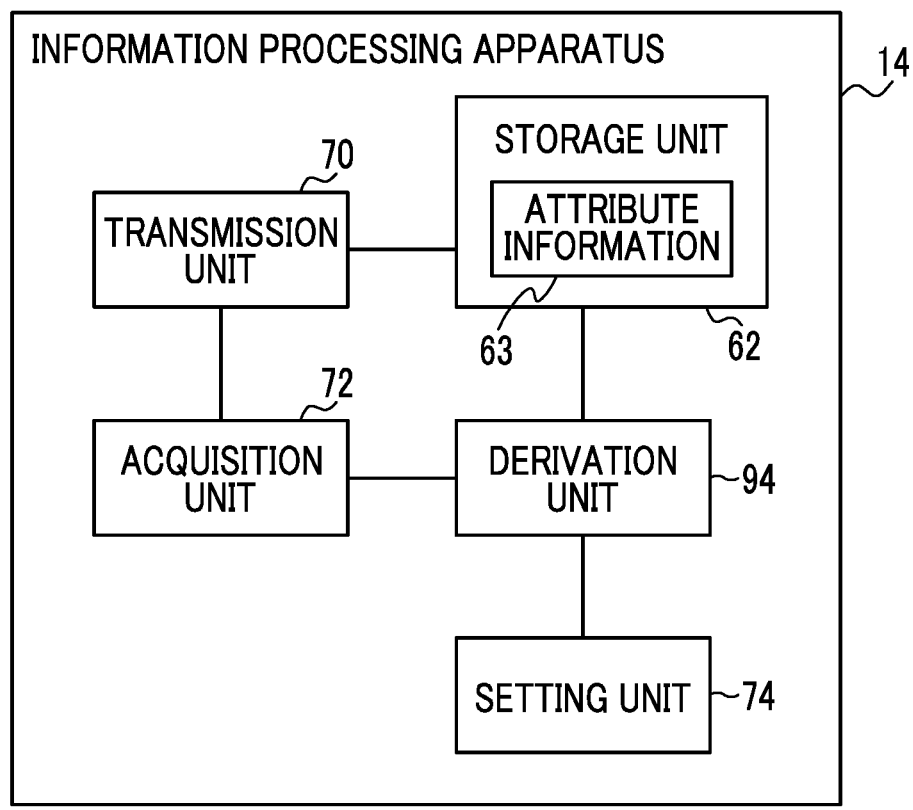
FIG. 11 is a function block diagram illustrating one example of the configuration of the information processing apparatus of the embodiment.

In addition, as illustrated in FIG. 11, the information processing apparatus 14 may have the function of the derivation unit 94 included in the server apparatus 16 in the embodiment. In this case, the information processing apparatus 14 may derive the recommended setting information corresponding to the attribute information 63 from the setting information database 85 stored in the storage unit 84 of the server apparatus 16. Accordingly, in the imaging system 10 of the present embodiment, an apparatus in which the derivation unit 94 is comprised is not particularly limited. In addition, an apparatus in which another functional units such as the setting unit 74 are comprised is not particularly limited. In addition, all of the functions of the information processing apparatus 14 may be incorporated in the imaging apparatus 12. In addition, in a case where the information processing apparatus 14 has an imaging function by comprising the imaging portion 22 like a function of a camera comprised in a smartphone, the information processing apparatus 14 may apply the imaging apparatus setting processing (refer to FIG. 7) to setting related to imaging performed by the imaging portion 22 of the information processing apparatus 14.

The imaging apparatus setting processing and the recommended setting information derivation processing that are executed by causing the CPU to execute software (program) in the embodiment may be executed by various processors other than the CPU. In this case, the processors are illustrated by a programmable logic device (PLD) such as a field-programmable gate array (FPGA) having a circuit configuration changeable after manufacturing, a dedicated electric circuit such as an application specific integrated circuit (ASIC) that is a processor having a circuit configuration dedicatedly designed to execute specific processing, and the like. In addition, the imaging apparatus setting processing and the recommended setting information derivation processing may be executed by one of the various processors or may be executed by a combination of two or more processors of the same type or different types (for example, a plurality of FPGAs and a combination of a CPU and an FPGA). In addition, hardware structures of the various processors are more specifically electric circuits in which circuit elements such as semiconductor elements are combined.

In the embodiment, each of the imaging apparatus setting processing program and the recommended setting information derivation processing program has been described as being prestored (installed) in the ROM 50B and the ROM 80B, but is not limited thereto. Each of the imaging apparatus setting processing program and the recommended setting information derivation processing program may be provided in an aspect in which each program is recorded on a recording medium such as a compact disk read only memory (CD-ROM), a digital versatile disk read only memory (DVD-ROM), and a universal serial bus (USB) memory. In addition, an aspect in which each of the imaging apparatus setting processing program and the recommended setting information derivation processing program is downloaded from an external apparatus through the network may be available.

EXPLANATION OF REFERENCES

10: imaging system
12, $12_1$ to $12_n$: imaging apparatus
14, $14_1$ to $14_n$: information processing apparatus
16: server apparatus
19: network
20: imaging control unit
20A, 50A, 80A: CPU
20B, 50B, 80B: ROM
20C, 50C, 80C: RAM
22: imaging portion
24: image memory
26: image processing unit
28, 56: display control unit
30, 58: display unit
32, 52: reception I/F
34, 54: operation unit
36: media I/F
38: memory card
40, 60, 82: I/F unit
42, 62, 84: storage unit
43: setting information
49, 69, 89: bus
50: information control unit
63: attribute information
70, 96: transmission unit
72: acquisition unit
74: setting unit
80: processing control unit
85: setting information database
90: reception unit
92: processing unit
94: derivation unit

What is claimed is:

1. An imaging system comprising:
   an information processing apparatus including a transmission processor that transmits attribute information related to a user performing imaging using an imaging portion and setting information representing setting related to the imaging performed by the imaging portion, at a predetermined timing;
   a server apparatus including a processing processor that receives a plurality of combinations of the attribute information and the setting information and performs statistical processing on the combinations of the attribute information and the setting information based on the plurality of combinations of the attribute information and the setting information;
   a derivation processor that derives a recommended value of the setting information corresponding to the attribute information as a derivation target for the recommended value from a result of the statistical processing performed by the processing processor of the server apparatus; and
   a setting processor that sets the recommended value derived by the derivation processor as the setting information related to the imaging performed by the imaging portion,
   wherein the setting processor does not set the recommended value within a predetermined period from when the setting related to the imaging performed by the imaging portion is changed by the user.

2. The imaging system according to claim 1,
   wherein in a case of performing initial setting of the setting information, the transmission processor transmits the attribute information as the derivation target for the recommended value.

3. The imaging system according to claim 1,
   wherein the attribute information includes a feature amount obtained from a history of operations performed by the user with respect to the imaging.

4. The imaging system according to claim 2,
   wherein the attribute information includes a feature amount obtained from a history of operations performed by the user with respect to the imaging.

5. The imaging system according to claim 1, further comprising:
   a display unit that displays information for causing the user to provide an instruction for whether or not to set the recommended value within a predetermined period from when the setting related to the imaging performed by the imaging portion is changed by the user.

6. The imaging system according to claim 2, further comprising:
   a display unit that displays information for causing the user to provide an instruction for whether or not to set the recommended value within a predetermined period from when the setting related to the imaging performed by the imaging portion is changed by the user.

7. The imaging system according to claim 3, further comprising:
   a display unit that displays information for causing the user to provide an instruction for whether or not to set the recommended value within a predetermined period from when the setting related to the imaging performed by the imaging portion is changed by the user.

8. The imaging system according to claim 4, further comprising:
   a display unit that displays information for causing the user to provide an instruction for whether or not to set the recommended value within a predetermined period from when the setting related to the imaging performed by the imaging portion is changed by the user.

9. The imaging system according to claim 1,
   wherein the setting processor sets the recommended value in a case where the recommended value is different from the setting information, and does not set the recommended value in a case where the recommended value is the same as the setting information related to the imaging performed by the imaging portion.

10. The imaging system according to claim 2,
wherein the setting processor sets the recommended value in a case where the recommended value is different from the setting information, and does not set the recommended value in a case where the recommended value is the same as the setting information related to the imaging performed by the imaging portion.

11. The imaging system according to claim 3,
wherein the setting processor sets the recommended value in a case where the recommended value is different from the setting information, and does not set the recommended value in a case where the recommended value is the same as the setting information related to the imaging performed by the imaging portion.

12. The imaging system according to claim 1,
wherein the processing processor performs the statistical processing by setting a weight of the combination of the attribute information and the setting information related to a user of which a frequency of performing the imaging is lower than a predetermined frequency to be lower than the combination of the attribute information and the setting information related to another user.

13. The imaging system according to claim 1,
wherein the predetermined timing is a timing based on a cumulative amount corresponding to the imaging performed by the imaging portion.

14. The imaging system according to claim 1,
wherein the derivation processor is included in the server apparatus.

15. The imaging system according to claim 1,
wherein the derivation processor is included in the information processing apparatus.

16. The imaging system according to claim 1,
wherein the attribute information includes at least one of information corresponding to a physical feature of the user, information corresponding to a sex of the user, information corresponding to an age of the user, or information corresponding to a locality related to the user.

17. An information processing apparatus comprising:
a processor configured to
transmit attribute information related to a user performing imaging using an imaging portion and setting information representing setting related to the imaging performed by the imaging portion, at a predetermined timing;
receive a plurality of combinations of the attribute information and the setting information and derive a recommended value of the attribute information as a derivation target for the recommended value from a result of statistical processing of a server apparatus performing the statistical processing on the combinations of the attribute information and the setting information based on the plurality of combinations of the attribute information and the setting information; and
set the derived recommended value as the setting information related to the imaging performed by the imaging portion,
wherein the processor does not set the recommended value within a predetermined period from when the setting related to the imaging performed by the imaging portion is changed by the user.

18. A server apparatus comprising:
a processor configured to
receive a combination of attribute information related to a user performing imaging using an imaging portion and setting information representing setting related to the imaging performed by the imaging portion, the attribute information and the setting information being transmitted from each of a plurality of information processing apparatuses at a predetermined timing;
perform statistical processing on the combinations of the attribute information and the setting information based on the plurality of combinations of the attribute information and the setting information; and
derive a recommended value of the attribute information as a derivation target for the recommended value from a result of the statistical processing,
wherein the processor performs the statistical processing by setting a weight of the combination of the attribute information and the setting information related to a user of which a frequency of performing the imaging is lower than a predetermined frequency to be lower than the combination of the attribute information and the setting information related to another user.

19. An information processing method using the information processing apparatus according to claim 17 comprising:
transmitting attribute information related to a user performing imaging using an imaging portion and setting information representing setting related to the imaging performed by the imaging portion, at a predetermined timing;
receiving a plurality of combinations of the attribute information and the setting information and deriving a recommended value of the attribute information as a derivation target for the recommended value from a result of statistical processing of a server apparatus performing the statistical processing on the combinations of the attribute information and the setting information based on the plurality of combinations of the attribute information and the setting information; and
setting the derived recommended value as the setting information related to the imaging performed by the imaging portion,
wherein the processor does not set the recommended value within a predetermined period from when the setting related to the imaging performed by the imaging portion is changed by the user.

20. A non-transitory computer readable recording medium storing an information processing program causing a computer comprised in the information processing apparatus according to claim 17 to execute a process, the process comprising:
transmitting attribute information related to a user performing imaging using an imaging portion and setting information representing setting related to the imaging performed by the imaging portion, at a predetermined timing;
receiving a plurality of combinations of the attribute information and the setting information and deriving a recommended value of the attribute information as a derivation target for the recommended value from a result of statistical processing of a server apparatus performing the statistical processing on the combinations of the attribute information and the setting information based on the plurality of combinations of the attribute information and the setting information; and
setting the derived recommended value as the setting information related to the imaging performed by the imaging portion,
wherein the processor does not set the recommended value within a predetermined period from when the setting related to the imaging performed by the imaging portion is changed by the user.

* * * * *